United States Patent
Gupta et al.

(10) Patent No.: US 10,026,075 B2
(45) Date of Patent: Jul. 17, 2018

(54) GIFT CARD E-BANK

(71) Applicants: Kishor Kumar Gupta, Johns Creek, GA (US); Preeti Gupta, Johns Creek, GA (US)

(72) Inventors: Kishor Kumar Gupta, Johns Creek, GA (US); Preeti Gupta, Johns Creek, GA (US)

(73) Assignee: Kishor Kumar Gupta, Johns Creek, GA (US)

( * ) Notice: Subject to any disclaimer, the term of this patent is extended or adjusted under 35 U.S.C. 154(b) by 495 days.

(21) Appl. No.: 14/489,476

(22) Filed: Sep. 18, 2014

(65) Prior Publication Data
US 2015/0081533 A1    Mar. 19, 2015

Related U.S. Application Data

(60) Provisional application No. 61/879,665, filed on Sep. 18, 2013.

(51) Int. Cl.
*G06Q 20/34* (2012.01)
*G06Q 20/38* (2012.01)
*G06Q 20/06* (2012.01)
*G06Q 20/22* (2012.01)

(52) U.S. Cl.
CPC ....... *G06Q 20/342* (2013.01); *G06Q 20/0655* (2013.01); *G06Q 20/227* (2013.01); *G06Q 20/381* (2013.01)

(58) Field of Classification Search
USPC .......................................... 705/39
See application file for complete search history.

(56) References Cited

U.S. PATENT DOCUMENTS

| | | | | |
|---|---|---|---|---|
| 8,589,267 B2* | 11/2013 | Hurst | .................. | G06Q 20/105 235/380 |
| 2009/0112709 A1* | 4/2009 | Barhydt | ................. | G06Q 20/10 705/14.27 |
| 2013/0218691 A1* | 8/2013 | Fargo | ................. | G06Q 30/0239 705/14.73 |
| 2013/0254074 A1* | 9/2013 | Joa | ......................... | G06O 30/06 705/27.1 |
| 2013/0254086 A1* | 9/2013 | Joa | ...................... | G06O 30/0207 705/37 |
| 2014/0081729 A1* | 3/2014 | Ocher | ................ | G06Q 30/0222 705/14.23 |

(Continued)

*Primary Examiner* — William E Rankins

(57) ABSTRACT

Disclosed herein are method, system and computer-readable storage media for gift card e-banking. This is a unique platform, where people can deposit and withdraw gift cards of any store, of any denomination, at any time and at any place from the bank. Gift cards are converted into virtual money not affiliated with any store. Unlike traditional banking system majority of transactions are in the form of gift cards. Customers have two types of accounts, gift card money account and fixed account. The gift cards deposited in the bank account are available to all the customers. Cards deposited in the fixed account are only available to the customer who owns that account. Customer may transfer gift card/virtual money from one account to another account. Gift card e-bank also issues its own gift card known as "one gift card", which facilitates customers to use any gift card at any store.

17 Claims, 12 Drawing Sheets

(56) References Cited

U.S. PATENT DOCUMENTS

2015/0278801 A1* 10/2015 Friedlander ........ G06Q 30/0207
                                                                705/41
2016/0232609 A1* 8/2016 Lindemulder ......... G06Q 40/04
2017/0024735 A1* 1/2017 Kawauchi ............ G06Q 20/403

* cited by examiner

GIFT CARD E-BANK

CROSS-REFERENCE TO RELATED APPLICATION(S)

This application claims the benefit of U.S. Provisional Patent Application Ser. No. 61/879,665, filed Sep. 18, 2013, the entirety of which is hereby incorporated herein by reference.

BACKGROUND OF THE INVENTION

1. Field of the Invention

The present invention relates to gift cards. More specifically the present invention relates to methods of gift card online banking.

2. Background of the Invention

People give and receive gift cards on all occasions for example festivals, birthdays, marriages, graduations, baby showers etc. Gift card is a kind of debit card for a particular store or merchant. Gift cards are very convenient as they save time in searching for a perfect gift. The most common problem however is, often there is a mismatch of what people need and what they get. For example a person gets a gift card of specific denomination of store A but does not want to buy anything from that store and actually needs something from store B. To use that gift card, the person is obligated to buy something which he or she does not need and cannot use the gift card money for buying the things he or she actually needs. Another crucial problem is small denomination gift cards or small money left in the gift card of different stores are often lost and wasted. People also have problems in keeping track of multiple gift cards and it is difficult to carry all the gift cards physically all the time.

In the literature there are some patents and in the market there are some products, which provide a platform for gift card exchange, buying and selling. These products not only charge heavy fee for these services but also do not solve customer's problem fully. This is the reason why these products are not popular among masses.

Our gift card e-banking or gift card online banking does not buy gift card from customer, does not offer any cash or check or lower denomination gift card to the customer. This gift card online banking method/system provides a unique, comprehensive, affordable and easy solution giving a perfect platform to the customers to use and manage their gift card the way they want, consolidating small money left in the gift card and keeping all their gift cards at one place for convenient use.

SUMMARY OF THE INVENTION

Gift card e-banking is a unique platform where people can deposit gift cards of any store and of any denomination. Some other names of gift card e-banking include gift card online banking, gift card internet banking and gift card virtual banking Customer can deposit gift card of a participating store, merchant, or gift card issuer in the bank list. Gift card amount is deposited in the customer account; however gift card is deposited in the bank account. The amount deposited in the customer account is not affiliated with any store and some of the names of this customer account include gift card money (GCM) account, current account or checking account. Some of the names of the bank account where these gift cards are deposited may be e-bank account, gift card bank account, bank stock, bank inventory, bank reservoir, and bank pool. Furthermore, customers can withdraw gift cards of their desired stores and desired denomination at any time and at anyplace from this bank account. This way, customers can also consolidate their cards as well. In this unique gift card e-bank, the majority of transactions are in the form of gift cards instead of in the form of currency as in a traditional banking system. Customers have the option of two types of accounts: gift card money (GCM) account and the second account may be called as saving or fixed account. All the gift cards deposited in the gift card e-bank (GCeB) bank account are available to all the customers and customers can withdraw gift cards of their desired store, of any desired denomination from this bank account at any time, at any place. Cards deposited in the fixed account are not a part of the bank account and are not available for customers other than the person who owns that account. In this online banking system, gift card received from the customer is converted into gift card money which may be called as GCM and processing and other fees is charged from the customer in the form of the gift card money (GCM) and the collected gift card money/gift card as a processing fee is deposited in the gift card bank fee account and available for sale to the customer. Gift card e-bank (GCeB) also issues its own gift card known as "one gift card" like Master™ or Visa™ card, which facilitates customers to use any gift card at any store.

In one exemplary embodiment, the gift card e-bank establishes an online or mobile banking method where unlike the traditional banking system; transactions take place mostly in the form of gift cards or gift card money.

Gift card e-bank establishes an online or mobile banking system where people can deposit, organize, consolidate, withdraw, and buy gift cards. It is a bank where customer can keep all of his or her gift cards for future use.

Gift card e-bank not only helps in keeping track of customer's gift card money but also prevents any kind of gift card loss.

Gift card e-bank has two types of accounts for its customers: gift card money account and fixed account.

Gift card money account (GCM A/c): Customers can deposit their gift cards in this account. Gift card requested to deposit in this account is first converted into an amount called gift card money (GCM), which is of same denomination but is not affiliated to any store.

Fixed account: To make sure customers can get the right gift cards when needed; they can deposit their gift card in their fixed account. Cards deposited in the fixed account are out of the gift card e bank bank account and not available for customers other than the person who owns the account. Customers can first deposit the gift card in their gift card money account and get the gift card of their desired store and desired denomination from the bank account. Then, customers can deposit their gift card in their fixed account for future use. This added feature of fixed account enables customers to get the right gift card at the right time even if that gift card is not available in the gift card bank account at that time.

Bank account: All the gift cards requested to deposit in the GCM account are added in the gift card e-bank bank account. Customers can withdraw gift cards of their desired store of any desired denomination from this bank account at any time and at any place. This gives customers the benefit of spending their gift card money according to their needs. Customers have the access to withdraw gift card of their choice from this account, If the card of a specific store and specific denomination is not available in the bank account, customers cannot get the card of that specific store and denomination. If the bank has the balance of that store, then the bank may buy the gift card of customer's desired denomination and provide to its customer.

Gift card bank fee account: Gift card equal to conversion/processing fee is transferred from bank account to gift card bank fee account. Gift cards in this account are available for sale.

Gift card money bank fee account (GCM bank fee A/c): Bank charges conversion/processing fee in the form of GCM either before or after depositing GCM in the customer GCM A/c and the bank fee in GCM is credited to the GCM bank fee A/c.

Customers can deposit their gift card of any store via any method not limited to phone, online, mobile devices, internet, mail, computer, tab, gaming devices, store, merchant etc. either by entering/submitting their gift card number, photo, scan, etc. and also physically by postal services.

After receiving the gift card information from the customer, the authenticity and balance of the gift card is checked and converted to a new gift card. The gift card money is then available to the customer. However gift card received directly from a store or merchant on behalf of a customer neither needs to be validated nor converted to a new gift card.

Gift cards are easily accessible to the customer via number of ways not limited to smartphones, computers, phone, internet, any mobile media, emails etc. or physically through postal services. Customers can send a gift card to their family and friends from their account directly.

Customers may track the balance in their gift card as gift card balance is updated automatically.

Customers may buy a gift card from the e-bank at a discounted rate using their credit card at any time and can save money on their purchases.

Gift card e-bank charges a processing fee. For instance if the bank charges 5% of the value of the gift card in the form of gift card money as a processing fee for a particular transaction, the remaining 95% value of the gift card is available to the customer as gift card money GCM).

If a customer has a gift card in the fixed account but wants some other gift card from the gift card e-bank bank account, the customer first needs to convert this gift card into GCM and deposit it in his or her GCM account and then withdraw the gift card of his or her choice from the bank account.

Gift card e-bank generates revenue through the processing fee for providing the services mostly in the form of GCM/gift card, which it may sell at a discounted rate.

Gift card e-bank always maintains gift card balance in its bank account equal to the total gift card money customers own in their GCM account.

In another exemplary embodiment, gift card e-bank issues/sells gift card debit card. This debit card may be called as "one gift card", which gives access to the customers to use the gift card money deposited in their GCM account, fixed account and also the discounted gift cards available for sale. Gift card debit card is like any other debit card e.g. Visa™ or Master Card™ Customers may use gift card debit card at any participating store and may use their gift card money (GCM) given the availability of the gift card of that particular store in the bank account or customer's fixed account. The concept behind this is to provide—"one gift card for all stores".

Customers can swipe their gift card debit card ("one gift card") at any participating store in the network and pay from their gift card e-bank accounts additionally they may buy gift card debit cards ("one gift card") for desired denomination for gifting it to their family and friends. Customer by using gift card debit card ("one gift card") at store not only have the access to their gift card money but also have the access to gift cards available for sale at a discounted rate and thus can save more.

"One gift card" removes the steps of taking out cards from the gift card e-bank bank account. When customers swipe their "one gift card" at the participating store, the store is paid directly from the bank.

In another exemplary embodiment, the present invention is a system for gift card online banking or gift card e-banking In yet another exemplary embodiment, the present invention is a computer program stored in a computer-readable medium for gift card online banking or gift card e-banking

BRIEF DESCRIPTION OF THE FIGURES OF THE DRAWINGS

The present invention is illustrated by way of examples, and not by way of limitations, in the figures of the accompanying drawings in which.

DETAILED DESCRIPTION OF THE INVENTION

Various embodiments of the invention are discussed in detail below. While specific implementations are discussed, it should be understood that this is done for illustration purpose only. A person skilled in the relevant art will recognize that other modifications, components and configurations may be used without parting from the spirit and scope of the disclosure. Accordingly, the specifications are to be regarded in an illustrative rather than a limiting sense.

Figure 1:
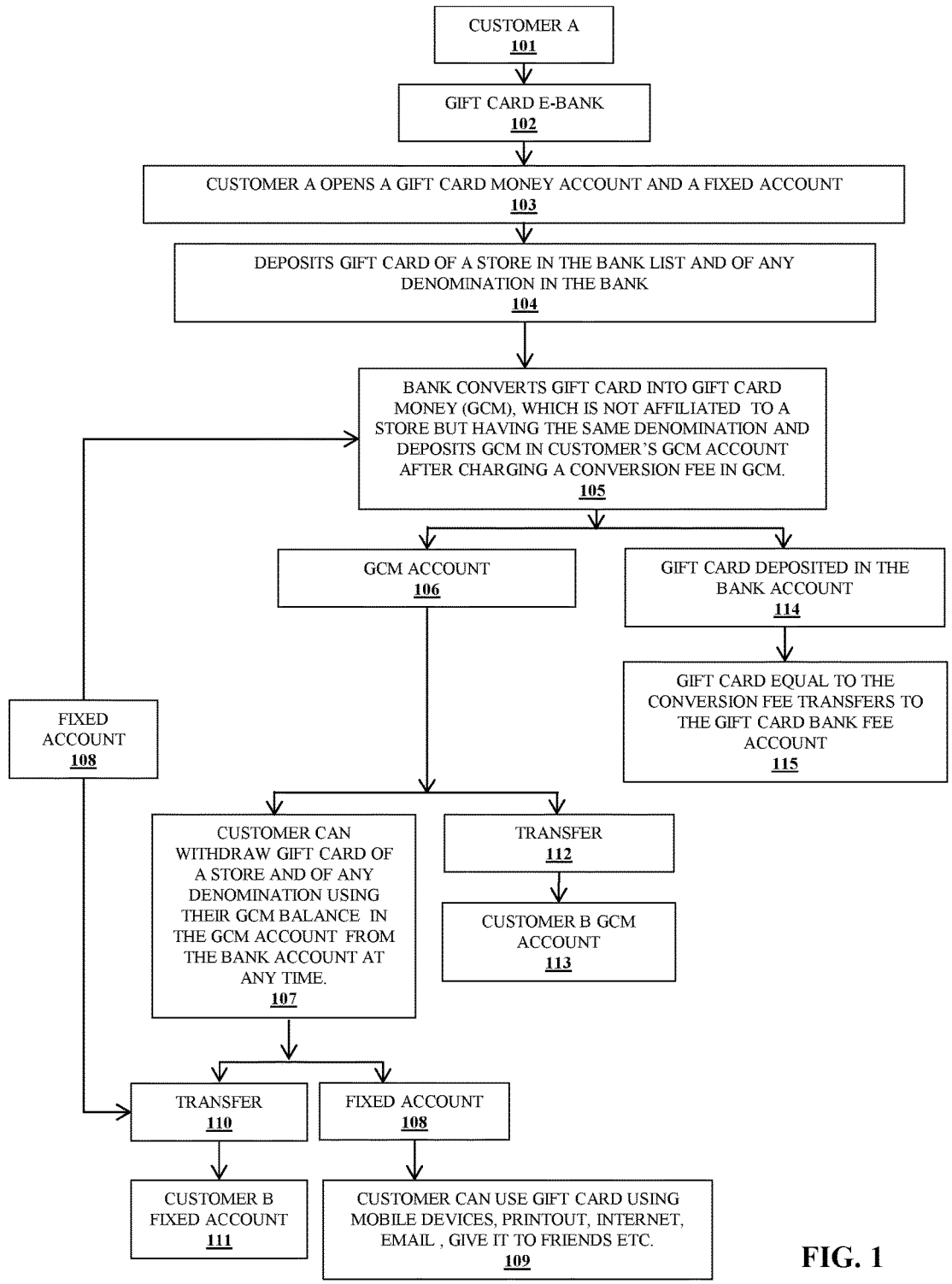
FIG. 1 is a functional block diagram illustrating an example of the gift card online banking in which various illustrative embodiments of the invention can be implemented.

FIG. 1 is a block diagram of an exemplary embodiment of gift card online banking method in which customer A 101 contacts gift card e-bank (GCeB) 102 and opens an account in the gift card e-bank 103. Customer A can operate his or her account in many ways some of them are shown in the FIG. 1. Customer A 101 can deposit gift card/cards of any store and of any denomination 104 in his or her fixed A/c 108 as it is for future use without paying any processing fee to the gift card e-bank. If Customer A 101 wants to change the store of the gift card/cards, he or she can deposit gift card/cards of any store and of any denomination 104 in his or her gift card money account (GCM A/c) 105. Before depositing the gift card/cards of customer A 101 in GCM A/c 106, bank converts the gift card into gift card money (GCM) 105 which has same denomination as the gift card but not affiliated to a particular store. Bank charges a processing fee 105 in the form of GCM and deposits the remaining balance of GCM in customer A's GCM A/c 106 and the gift card is deposited in the gift card e-bank bank account 114. Gift card equal to the conversion fee transfers to the gift card fee account 115. Using this GCM 106 in his or her GCM A/c, customer A can withdraw the gift card/cards of any denomination and of any store from the gift card e-bank bank account 107 and deposits in his or her fixed A/c 108. If customer A wants to buy new gift card/cards of a different store or different denomination gift card/cards of the same store, using gift card in his or her fixed A/c 108, customer A 101 first converts the gift card in GCM 105. After paying a processing fee 105 to the gift card e-bank, the balance GCM is then deposited in customer A's GCM A/c 106 and customer A is able to use the new balance in GCM A/c to withdraw new card/cards 107 and may deposit them back to his or her fixed A/c 108. Customer A 101 can transfer gift card from his or her fixed A/c 108 to GCM A/c 106, by paying a processing fee to the bank 105. Customer A 101 can transfer from his or her GCM in GCM A/c 106 to his or her fixed A/c 108 after withdrawing gift card from the bank account 107. Customer A 101 can transfer 110 gift card from his or her fixed A/c 108 to the fixed A/c of customer B 111 without paying any fee. Customer A 101 can also transfer gift card from his or her fixed A/c 108 to the GCM A/c of customer B 113 after converting gift card in his or her fixed A/c 108 to GCM by paying processing fee 105, depositing GCM in his or her GCM A/c 106 and then transferring 112 GCM amount of his or her choice to the GCM A/c of the Customer B 113. Customer A 101 can transfer a new gift card using his or her gift card in fixed A/c 108 to the fixed A/c of Customer B 111 by first converting the gift card in his or her fixed A/c 108 to GCM paying a processing fee 105, then depositing the GCM in his or her GCM A/c 106, withdrawing a new gift card using GCM 107 in his or her GCM A/c 106 and then transferring 110 new gift card in the fixed A/c of Customer B 111. In another scenario Customer A can transfer GCM of his or her choice from his or her GCM A/c 106 to customer B's fixed A/c 111 by withdrawing a new gift card using GCM 107 in his or her GCM A/c and then transferring 110 new gift cards in Customer B's fixed A/c 111. Customer A can transfer 112 GCM from his or her GCM A/c 106 to the GCM A/c of customer B 113 without paying any processing fee to the gift card e-bank.

As an example of the above said process in FIG. 1, if a customer A has a $100 Target gift card 104 in hand and his present GCM balance in GCM A/c 106 is $120 and wants to deposit this card in the gift card e-bank, keeping the same store and same denomination, customer A can do this by depositing it in the fixed A/c 108 without paying any fee to the gift card e-bank. Gift cards deposited in the fixed A/c 108 are available for use 24×7, their store and denomination does not change unless customer wants to do so. In one of the exemplary option after depositing in fixed A/c if customer A wants to convert $100 Target gift card 104 deposited in the fixed A/c 108 to gift card money (GCM) 105, either to keep in the form of GCM or to buy gift card of another store, gift card e-bank converts the gift card into GCM 105 and after charging for example $5 processing fee in the form of gift card money (GCM), credits the balance GCM $95 to the GCM A/c 106 of customer A. Now the balance in the gift card money account (GCM A/c) 106 of customer A becomes $215. In another scenario, if customer A wants to transfer 110 $100 Target gift card 104 from his/her fixed A/c 108 to the fixed A/c of customer B 111, Target $100 gift card will be credited to the fixed A/c of customer B 111 on the request of customer A without charging any fee. In yet another exemplary embodiment, if customer A wants to transfer $100 target gift card 104 to the GCM A/c of the customer B 113, customer A first needs to convert the gift card into gift card money (GCM) 105 and after charging $5 processing fee 105 in the form of GCM, the balance GCM of $95 is credited by the gift card ebank to the GCM A/c 106 of customer A. Customer A may then transfer 112 $95 or desired GCM in customer B's GCM A/c 113. In yet another scenario, if customer A wants to transfer $150 to the GCM A/c of customer B 113, since the present balance in customer A's GCM A/c 106 is $120, customer A needs to transfer gift card from his/her fixed A/c 108 to the GCM A/c 106. Suppose customer A transfers $100 Target gift card 104 to the GCM A/c 106 from his/her fixed A/c 108 and after paying processing fee 105, $95 GCM money will be credited to the GCM A/c of Customer A 106 and the balance in his/her GCM A/c 106 becomes $215. Now customer A. can transfer 112 $150 to the GCM A/c of customer B 113. After transferring $150 to customer B's GCM A/c 113, the balance in customer A's GCM A/c 106 becomes $65. In another exemplary embodiment, customer A wants to transfer $95 Macy's gift card to the fixed A/c of customer B. If customer A has $95 Macy's gift card in his or her fixed A/c 108 he or she can do it without paying any fee to the gift card e-bank and $95 Macy's gift card is transferred 110 to the fixed of customer B 111. Since in the present example, customer A do not have $95 Macys gift card in his or her fixed A/c 108, then customer A can either use the GCM money of $120 in the GCM A/c 106 to withdraw $95 Macys gift card 107 from the gift card e-bank bank account and transfer 110 it to fixed A/c of customer B 111, or use $100 Target gift card 104 to withdraw $95 Macys gift card 107 after giving $5 processing fee 105 to the gift card e-bank and then transfer 110 it to the fixed A/c of customer B 111.

In the same example of the above said process in FIG. 1, if a customer A has a $100 Target gift card 104 in hand and his present GCM balance in GCM A/c 106 is $120 and does not want to keep the gift card of the same store, in this example $100 Target gift card 104, he or she can deposit the gift card in his or her gift card money account (GCM A/c) 106. Gift card e-bank then converts the gift card into gift card money (GCM) 105 of $100 which is not affiliated to any store 105. Gift card e-bank charges the processing fee in the form of GCM 105 of $5 and credit $95 to the customer A's GCM A/c 106 and $5 fee in the GCM bank fee A/c. In one of the exemplary option after depositing in GCM A/c, if customer A is not sure about which store gift card he/she may need in the future, then customer A can leave the GCM in GCM A/c 106. Since previous GCM A/c balance 106 was $120, with the present deposit of $95 it now becomes $215 106. In another scenario, if the customer A has a specific store in mind, he/she can use this GCM 106 to buy the gift card 107 of his or her choice of any denomination from the gift card online bank's bank account and deposit it in the fixed A/c 108 for future use. For example if customer A wants to withdraw $25 Macy's gift card and $15 Best Buy gift card, they can use $40 of GCM A/c 106 to withdraw these cards. Since the previous balance in the GCM A/c was $120 106 and with the present deposit of $95 it is $215 106, after purchasing $25 and $15 gift cards of Macy's and Best Buy respectively the remaining balance 106 now becomes $175. In yet another embodiment, customer A can request the gift card e-bank to transfer the money from GCM A/c 106 to customer B's GCM A/c 113. For example if customer A wants to transfer 112 $110 to customer B's GCM A/c 113, on request from Customer A, the gift card e-bank transfers the money to the GCM A/c of customer B 113 and the remaining balance after transfer in customer A's GCM A/c becomes $105, 106. In yet another scenario, customer A can use his or her GCM at any time to withdraw a gift card from the bank account. For example if customer A wants to withdraw $75 Staples gift card from the gift card e-bank's bank account using his or her GCM in the GCM A/c 106, after withdrawing the gift card 107, the GCM A/c balance 106 of customer A becomes $140. Customer A can now deposit this card either in his or her fixed A/c 108 or transfer 110 it to the fixed A/c of customer B 111.

Figure 2:
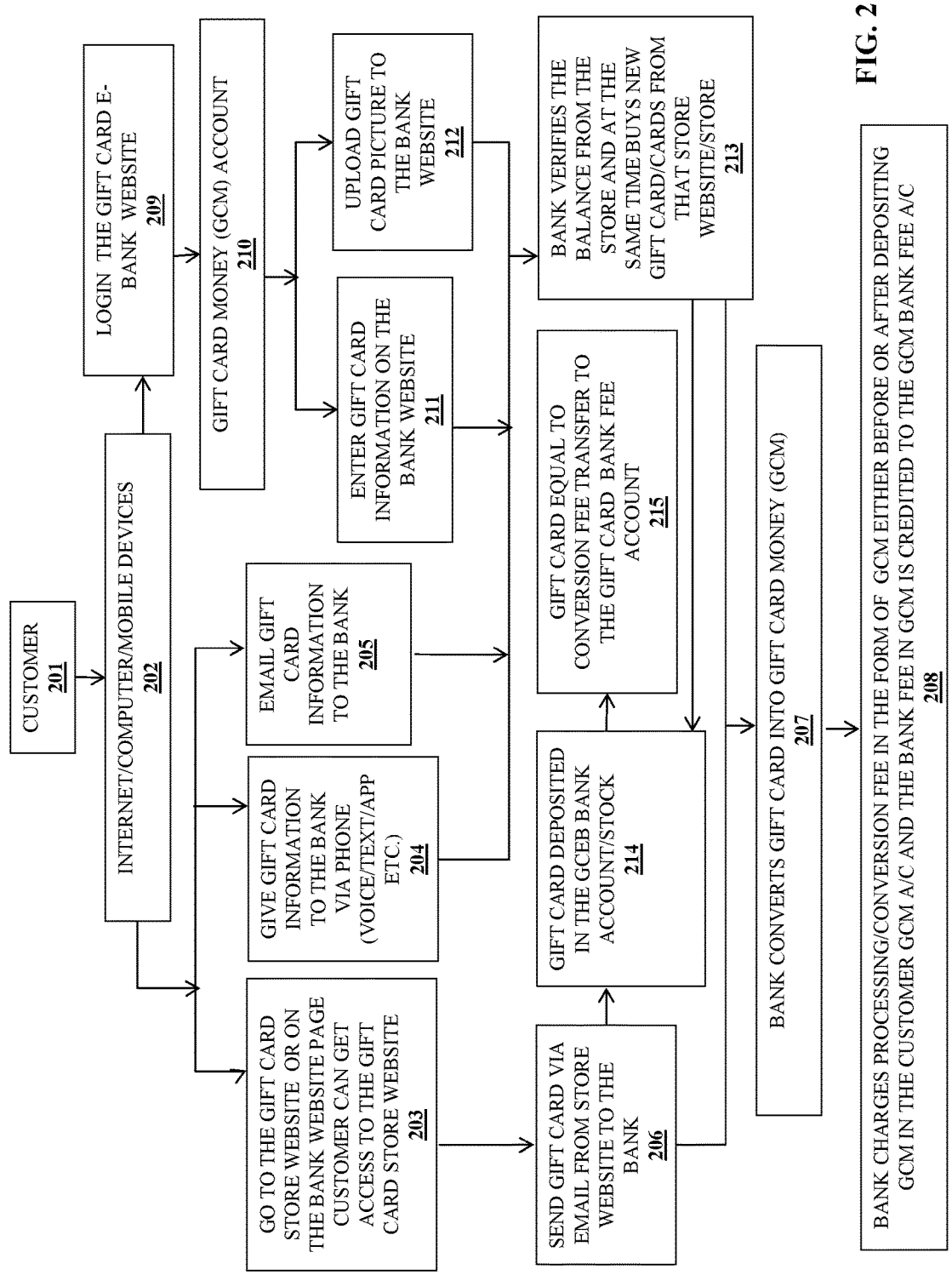
FIG. 2 is a diagram illustrating an example of a customer depositing a gift card in gift card money account (GCM A/c)

FIG. 2 is a block diagram of an exemplary method in which a customer 201 wants to deposit a gift card of any store and of any denomination in gift card money account (GCM A/c). There are many ways to deposit a gift card in his or her gift card e-bank account. This figure explores some of those pathways. One of the ways in which a customer can deposit a gift card in the bank is by accessing the internet using a computer, laptop, tablet, smart phone etc. 202 to access the gift card store website either directly or via the gift card e-bank website 203. Customers, using their gift card on the store website, can buy a new gift card and request the store to send the new gift card via email directly to the gift card e-bank (GCeB) with a message including their gift card e-bank account number 206 in it. GCeB converts the gift card into gift card money 207 and the gift card e-bank charges processing/conversion fee in the form of GCM either before or after depositing GCM in the customer account and the bank fee in GCM is credited to the GCM bank fee account 208. Bank deposits this gift card in the gift card e-bank bank account 214. Other ways to give gift card information to the bank are via phone, text message, voicemail, an app etc. 204 or by emailing gift card information to the bank 205. Another way, a customer can deposit a gift card in GCM A/c is by accessing the gift card e-bank website 209 using any of the devices such as computer, laptop, tablet, smart phone, apps etc. 202. The customer goes to GCM A/c 210 and either enters gift card information 211 in his or her account or upload the gift card picture 212 in the account. Bank gets the customer's gift card information as mentioned above 204, 205, 211, 212 but is not limited to these ways. In the next step, the bank verifies the balance in the gift card 213 by contacting the store, store website, or automatically getting information by connecting to the store website. Once the balance is confirmed with the customer, the bank buys gift card/cards from the store or its website 213. New gift card/cards are deposited to the Gift card e-bank bank account/stock 214 and the bank converts gift cards into gift card money (GCM) 207. The Gift card e-bank charges processing/conversion fee in the form of GCM either before or after depositing GCM in the customer account and the bank fee in GCM is credited to the GCM bank fee account 208. Gift card equal to the processing/conversion fee transfers from bank account 214 to the gift card bank fee account 215.

Figure 3:
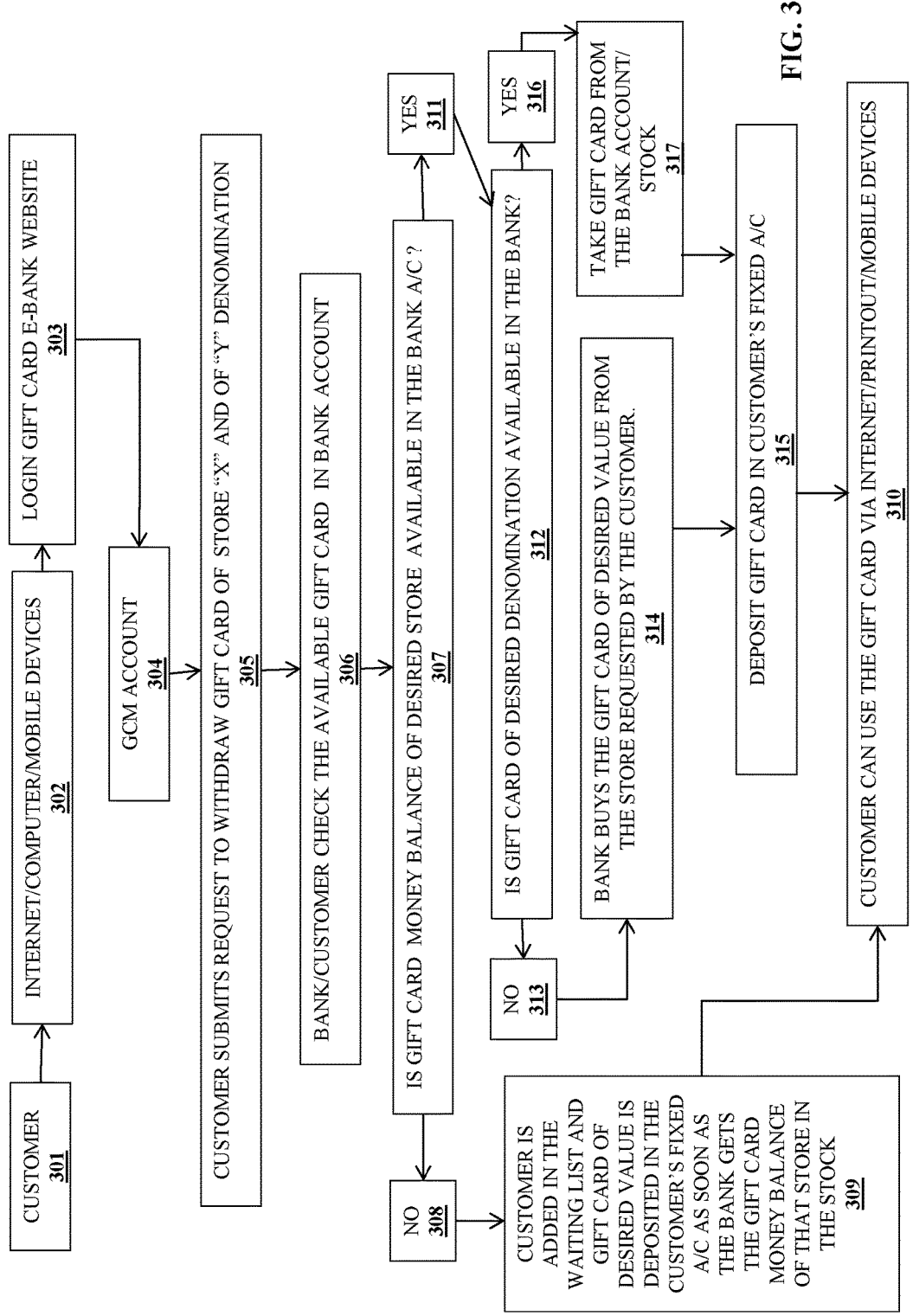
FIG. 3 is a block diagram illustrating an example of a customer withdrawing a gift card from the gift card e-bank bank account (bank A/c)

FIG. 3 is an exemplary embodiment of a customer buying a gift card of any desired store and of any desired denomination using virtual money GCM in his or her GCM account. Customer 301 accesses gift card e-bank website by using any of the devices for example computer, laptop, tablet, smart phone etc. 302 and login 303 to the gift card e-bank website. The customer accesses his or her GCM A/c 304 and submits a request to withdraw the gift card of desired store and desired denomination 305. Customer/bank checks 306 whether gift card money balance of desired store is available in the bank account 307, if yes 311 the customer checks whether the gift card of desired denomination is available in the bank account 312. If it is available 316 the customer withdraws this gift card from the bank account/stock 317 and deposits it in his or her fixed account 315. If the customer finds that gift card money balance of desired store is available in the bank account 311 but desired denomination gift card is not available 313, the customer can submit a request to the bank for the desired denomination gift card and the bank buys the gift card of desired value from that store 314 and deposits it in the customer's fixed account 315. If the bank/customer finds there is not enough balance 308 of the desired store in the bank 307, the customer is added to the waiting list 309 and the gift card of desired value is deposited in the customer's fixed account as soon as the bank gets the gift card money balance of that store in the stock. After submitting a request 305 bank deposits gift card/cards of desired store and denomination automatically to the customer's account immediately if bank has the balance and desired denomination gift card. The customer can use this gift card via internet, printout mobile devices etc. 310.

Figure 4:
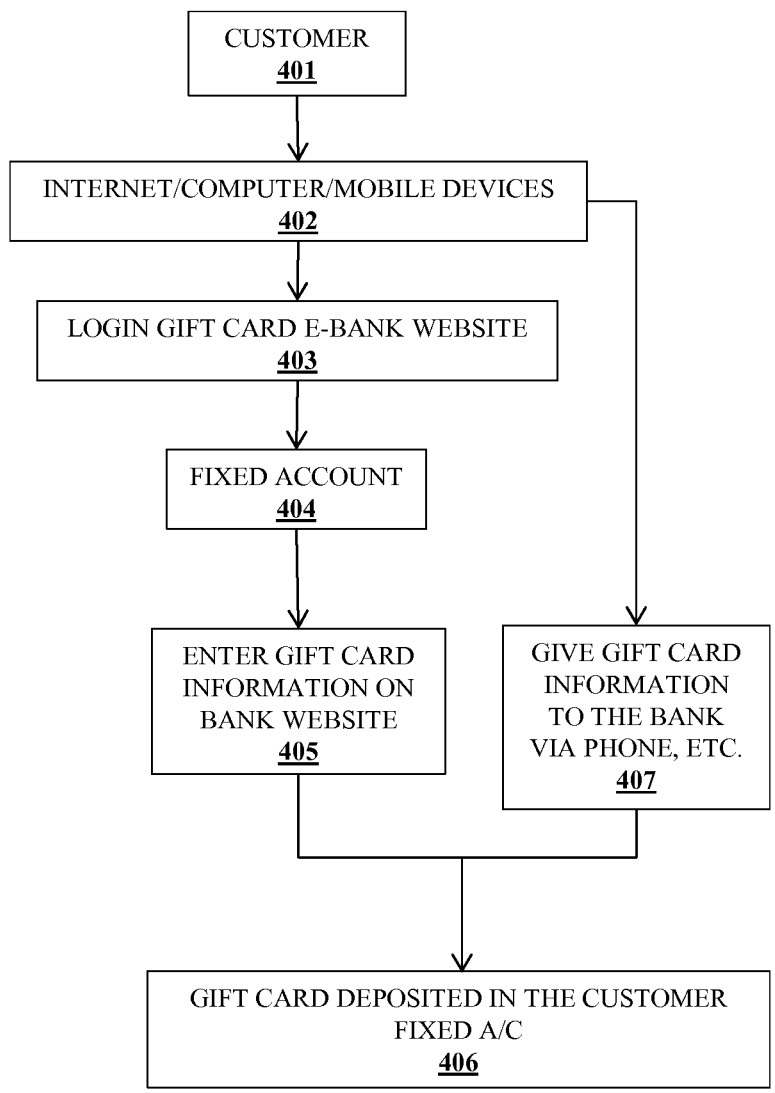
FIG. 4 is a diagram illustrating an example of a customer depositing a gift card in the fixed account.

FIG. 4 illustrates an example of a customer depositing a gift card of any store and of any denomination to his or her fixed bank account. Customer 401 accesses gift card e-bank website via any of the devices for example computer, laptop, tablet, smart phone etc. 402 and login to the gift card e-bank website 403. The customer submits the gift card/cards information in the fixed account 404 or on the bank website 405. Customer can submit gift card information in many ways which are not limited to entering gift card information on the bank website 405 or via phone or mobile devices or apps or uploading picture 407. Gift card is deposited to the customer's fixed account 406.

Figure 5:
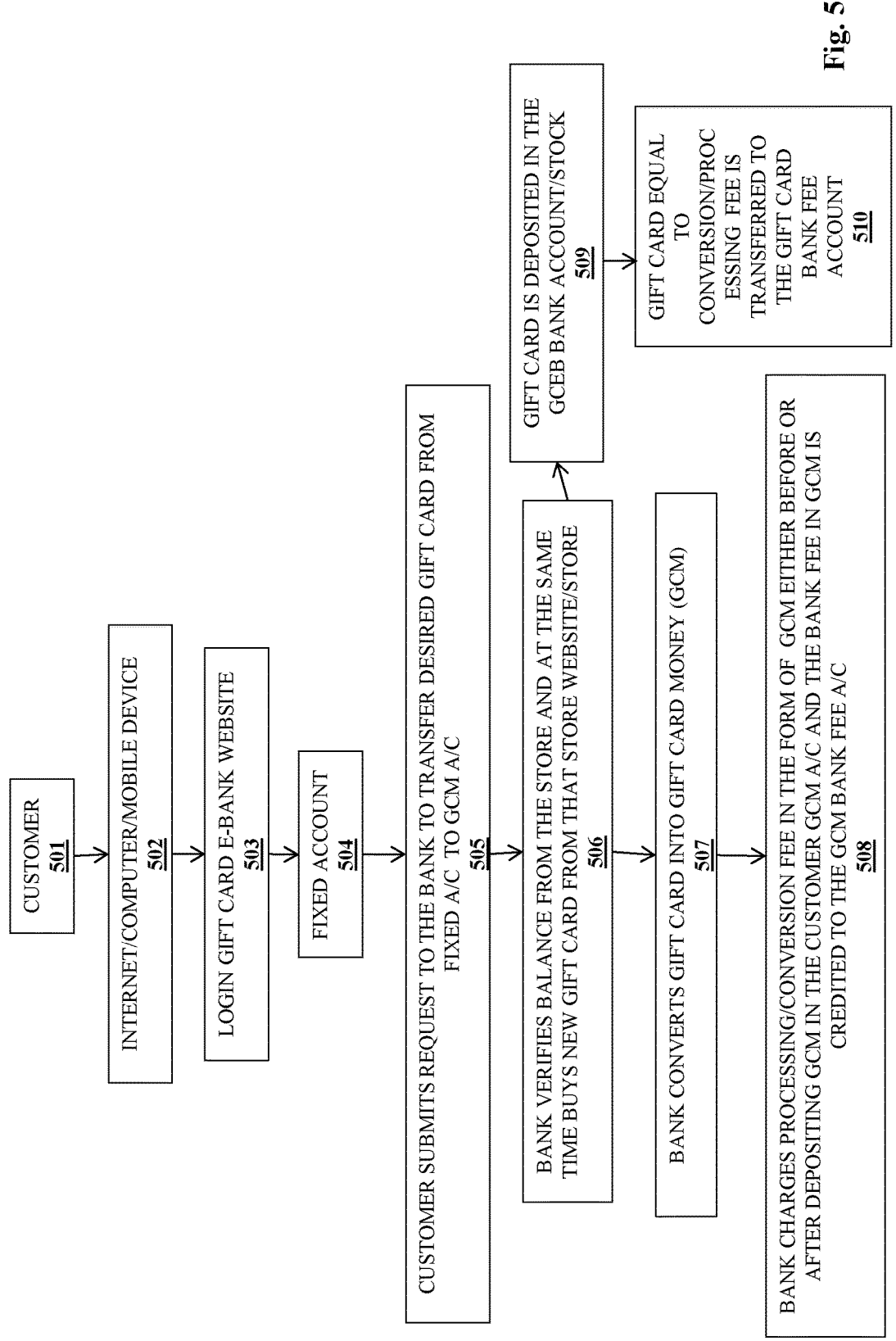
FIG. 5 is a diagram illustrating an example of a customer transferring gift card from the fixed account to the gift card money account (GCM A/c)

FIG. 5 is an example of a customer transferring the gift card from his or her fixed account to gift card money (GCM) account. Customer 501 accesses gift card e-bank website via. any of the devices for example computer, laptop, tablet, smart phone etc. 502 and login to the gift card e-bank website 503. The customer goes to the fixed account 504 and submits a request for transferring the desired gift card from his or her fixed account to GCM account 505. The bank verifies the balance in the gift card 506 by contacting the store, store website, or automatically getting information by connecting to the store website. Once the balance is confirmed with the customer, the bank buys gift card/cards from the store or its website 506. New gift card/cards are deposited to the bank account/stock 509 and the bank converts gift card into gift card money (GCM) 507. The Gift card e-bank charges processing/ conversion fee in the form of GCM either before or after depositing GCM in the customer account and the bank fee in GCM is credited to the GCM bank fee account 508. Gift card equal to the processing/conversion fee transfers from bank account 509 to the gift card bank fee account 510.

Figure 6:
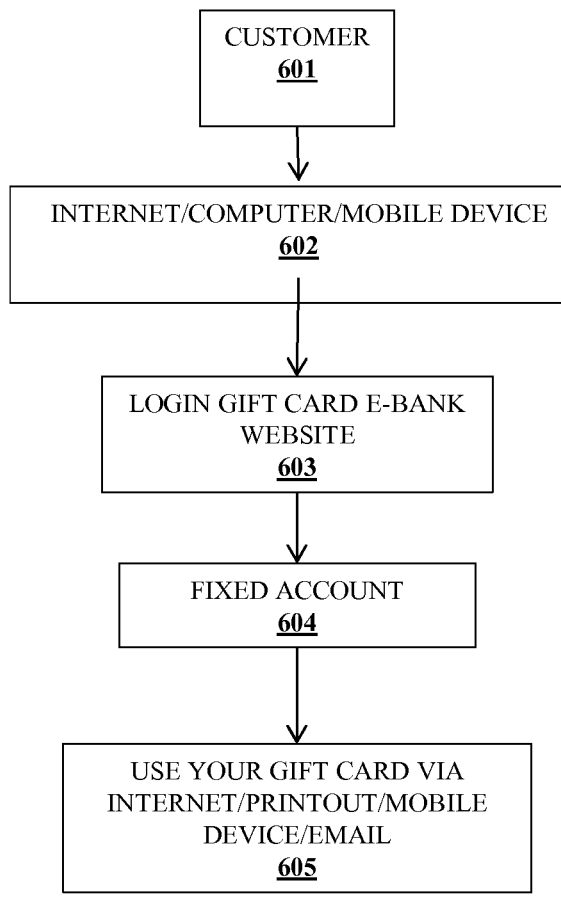
FIG. 6 is a block diagram illustrating an example of a customer using a gift card in the fixed account.

FIG. 6 is an exemplary embodiment of a customer using the gift card in his or her fixed account. Customer 601 accesses gift card e-bank website via any of the devices for example computer, laptop, tablet, smart phone, apps etc. 602 and login 603 to the gift card e-bank website. The customer goes to his or her fixed account 604 and can use gift card via many ways including, mobile devices, emailing it to family and friends or using printout of gift card information, etc. 605.

Figure 7:
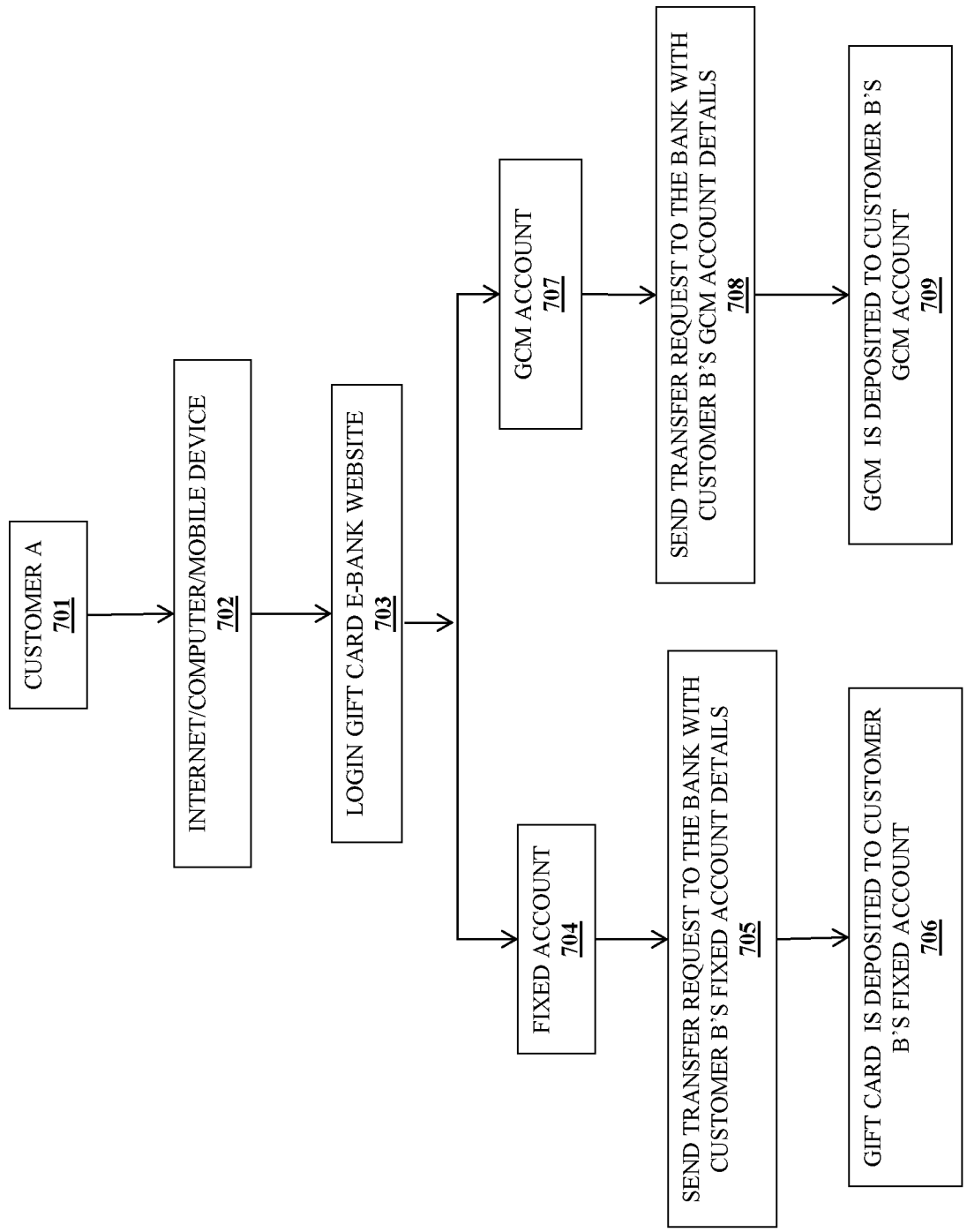
FIG. 7 is a diagram illustrating an example of customer A transferring a gift card from his or her fixed account to customer B's fixed account or gift card money from his or her gift card money account (GCM A/c) to customer B's gift card money account (GCM A/c)

FIG. 7 illustrates an example of customer A transferring a gift card from his or her fixed account to customer B's fixed account or GCM from his/her GCM account to customer B's GCM account. Customer A 701 accesses the gift card e-bank website via. any of the devices for example computer, laptop, tablet, smart phone etc. 702 and login 703 in to the gift card e-bank website. In his or her fixed account, 704 customer submits a request to transfer the gift card to customer B's fixed account with customer B's account details 705. Bank deposits the gift card selected by customer A from his or her account to customer B's fixed account 706. Similarly, customer A can transfer GCM money from his GCM account to customer B's GCM account. Customer A can access his or her GCM account and submit a request to transfer GCM to customer B's GCM account with customer B's GCM account details 708. Bank deposits the GCM from customer A's GCM A/c to customer B's GCM account 709.

Figure 8:
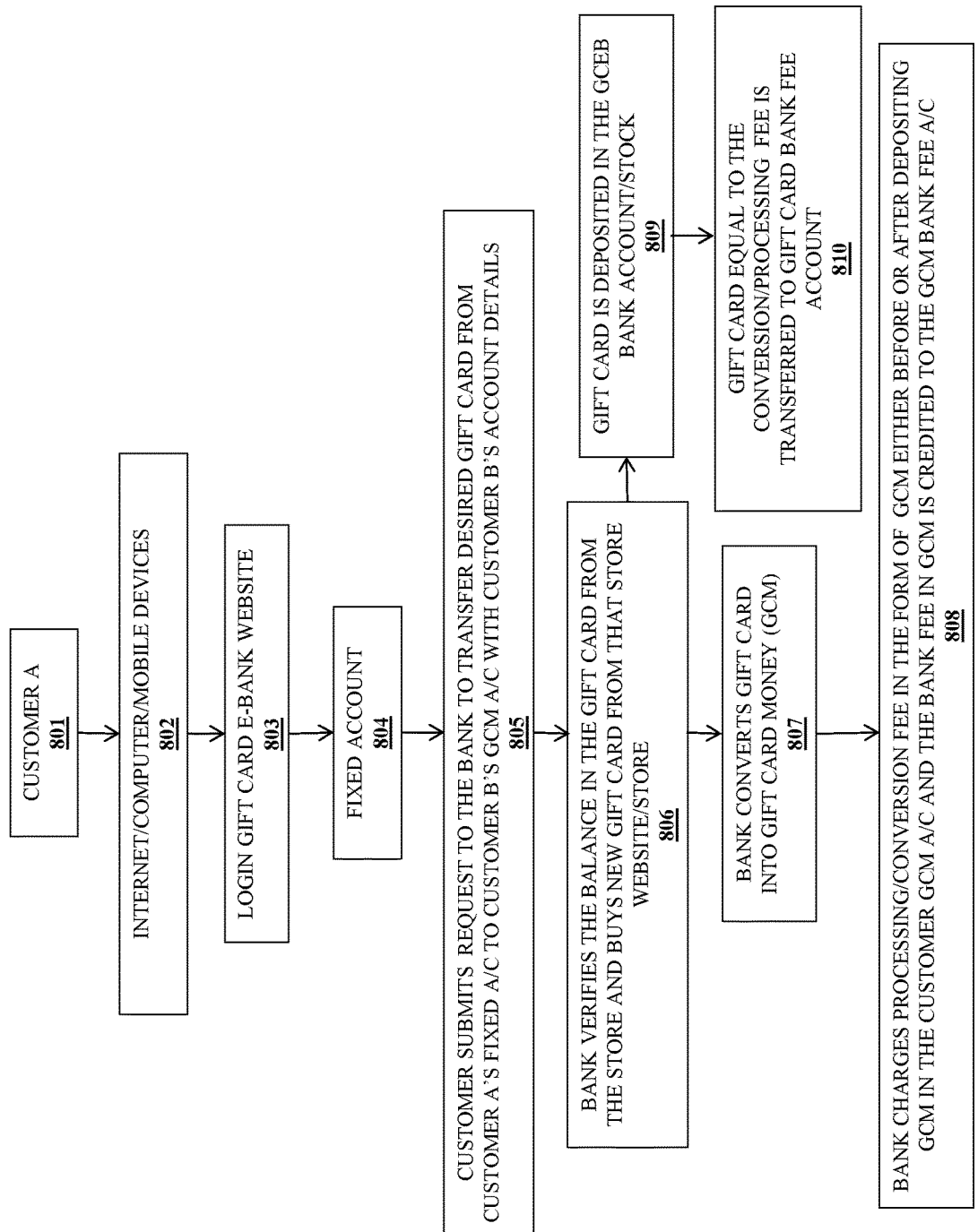
FIG. 8 is a block diagram illustrating an example of customer A transferring a gift card from his or her fixed account to customer B's gift card money account (GCM A/c)

FIG. 8 is a block diagram of an exemplary method in which customer A wants to transfer a gift card from his or her fixed account to customer B's GCM account. Customer A 801 can access gift card e-bank website via any of the devices e.g. computer, laptop, tablet, smart phone etc. 802 and login 803 to the gift card e-bank website In his or her fixed account, 804 a customer submits a request to transfer a gift card to customer B's GCM A/c with customer B's A/c details 805. Bank gets the customer's gift card information from customer A's fixed account and verifies the balance in the gift card 806 by contacting the store, store website, or automatically getting information by connecting to the store website. Once the balance is confirmed with the customer, the bank buys gift card/cards from the store or its website 806. New gift card is deposited to the gift card e-bank bank account/stock 809 and the bank converts gift card into gift card money (GCM) 807. Gift card with a denomination equal to the conversion/processing fee is transferred to the gift card bank fee account 810. The gift card e-bank charges processing/conversion fee in the form of GCM either before or after depositing GCM in the customer account and the bank fee in GCM is credited to the GCM bank fee account 808.

Figure 9:
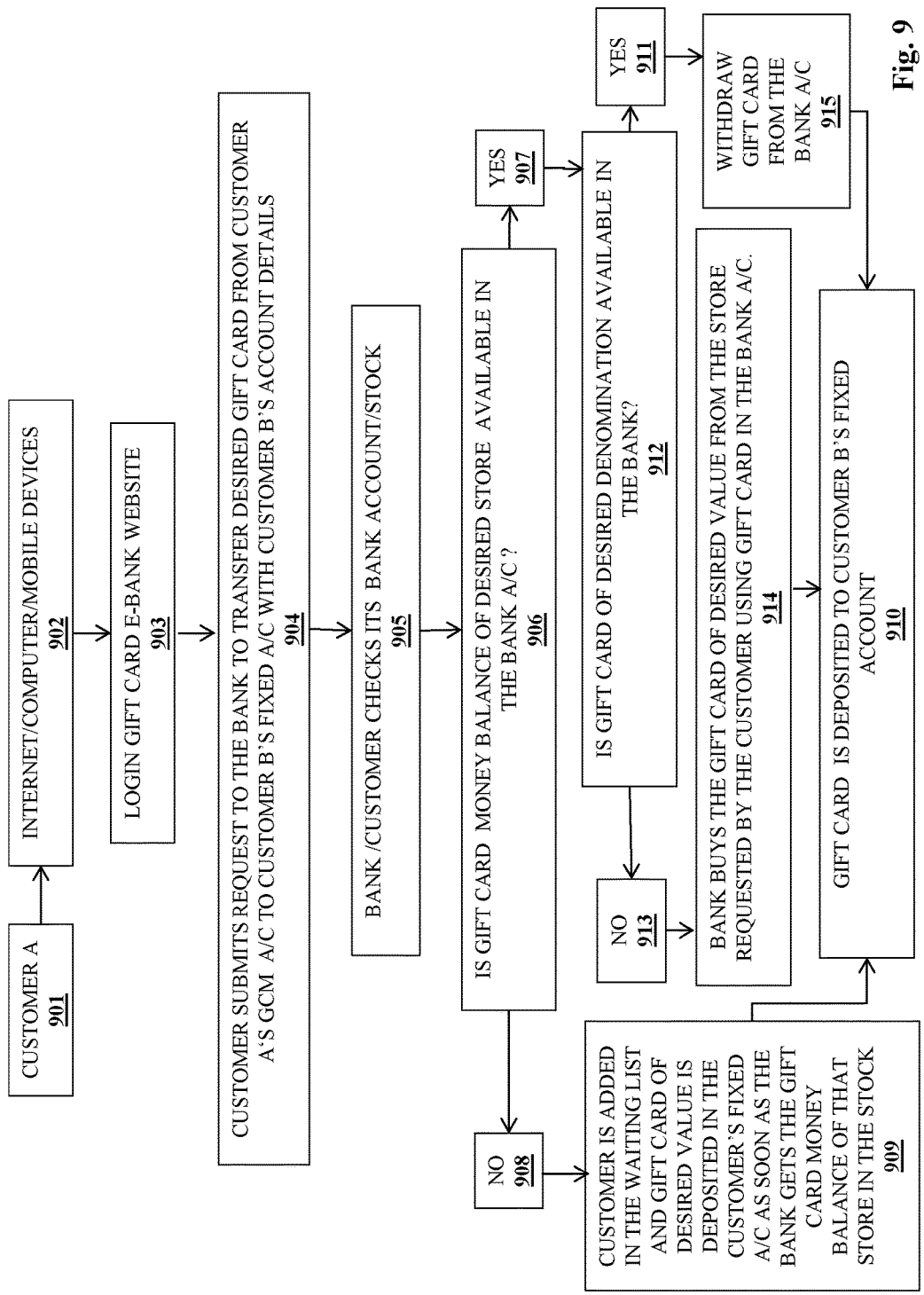
FIG. 9 is a block diagram illustrating an example of customer A transferring a gift card using gift card money to customer B's fixed account.

FIG. 9 is a block diagram of an exemplary method in which customer A wants to send a gift card from his or her GCM account to customer B's fixed account. Customer A 901 accesses gift card e-bank website via. any of the devices for example computer, laptop, tablet, smart phone etc. 902 and login to the gift card e-bank website 903. In his or her GCM account, the customer submits a request to transfer a gift card of desired store and denomination from his or her GCM account to customer B's fixed account with customer B's fixed account details 904. Bank/customer checks the bank account 905 and if desired store balance 906 is available 907, customer checks if desired denomination gift card is available 912. If it is present, 911 customer withdraws the card 915 and deposits in his or her fixed account 910. If customer finds there is not enough balance 908 of the desired store in the bank 906, customer is added to the waiting list 909 and when the desired balance is available in the bank, a gift card is deposited in the customer's fixed account 909. Bank does this process automatically as well.

Figure 10:
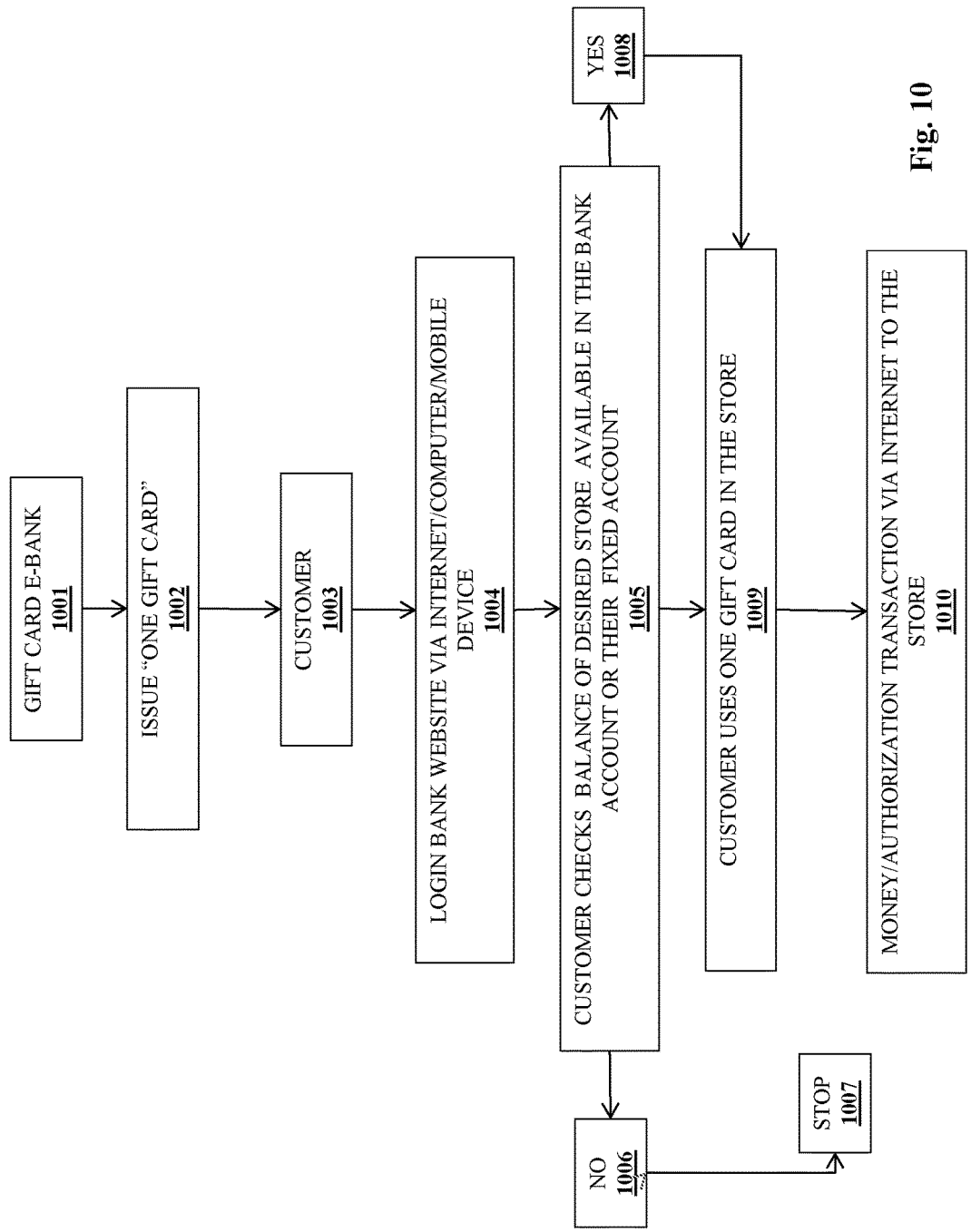
FIG. 10 is a block diagram illustrating an example of gift card e-bank issuing "one gift card" and its method of transaction.

FIG. 10 is a block diagram of an exemplary method in which the bank issues a gift card to the customer called "one gift card", which can be used in place of all other gift cards. Using this card customer can use GCM in their GCM A/c and gift card in their fixed A/c to purchase from any participating store and of any value. Gift card e-bank 1001 issues "one gift card" 1002 to the customer 1003. Customer can check GCM balance 1005 and gift cards in his or her fixed account 1005 by accessing their bank account 1004 on bank website via computer, phone, apps, mobile devices etc. If customer has balance or credit line, 1008 customer can use "one gift card" at any participating store 1009 up to the balance in their bank account or credit limit. If a customer does not have any one of these, 1006 customer would not be able to use "one gift card" 1007. When swiping "one gift card" in the store or online, money transaction takes place via network/internet 1010. Gift card e-bank "one gift card", facilitates customers to use any gift card at any store.

Figure 11:
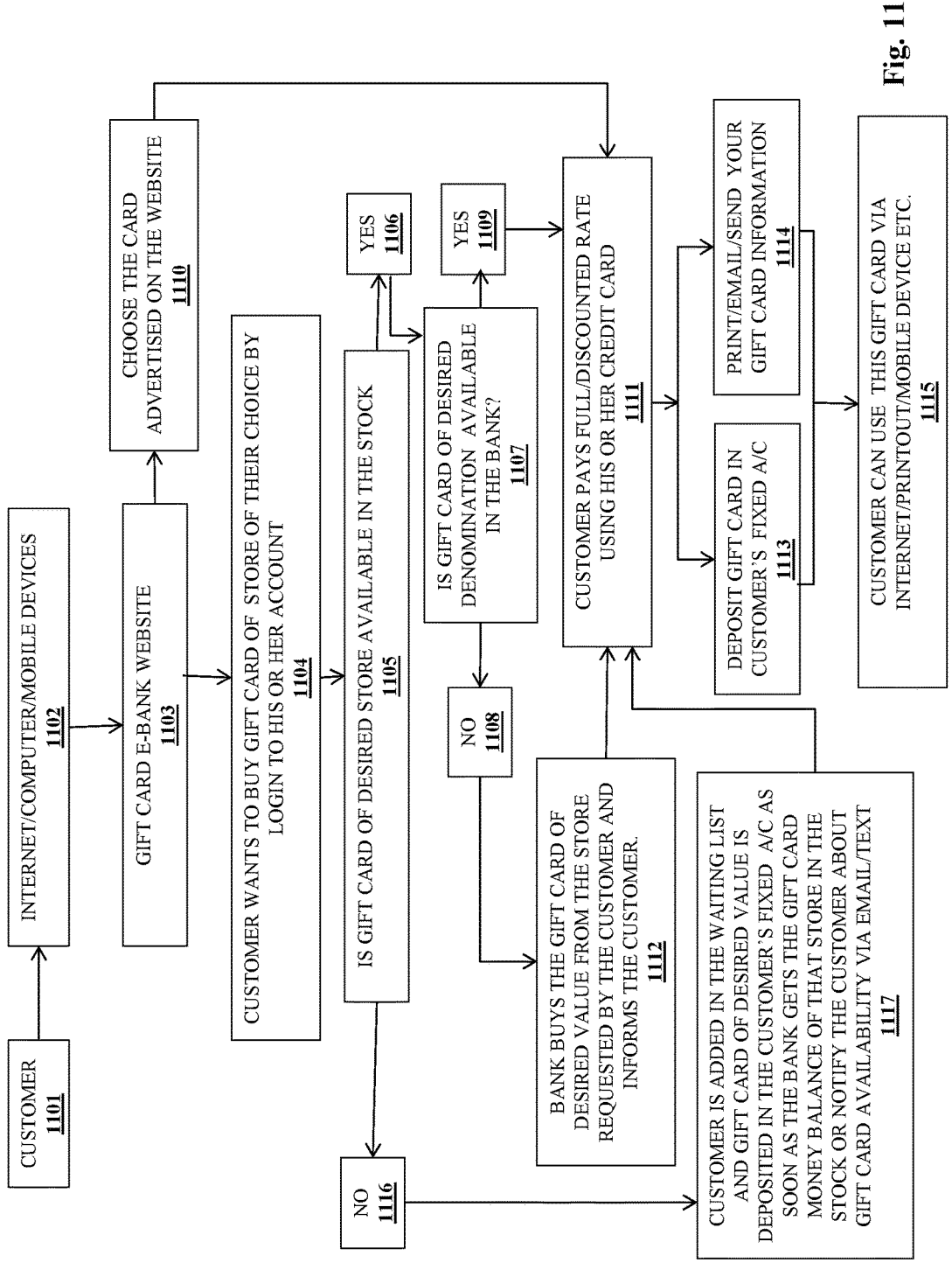
FIG. 11 is a diagram illustrating an example of a customer buying a gift card from the gift card online bank.
Figure 12:
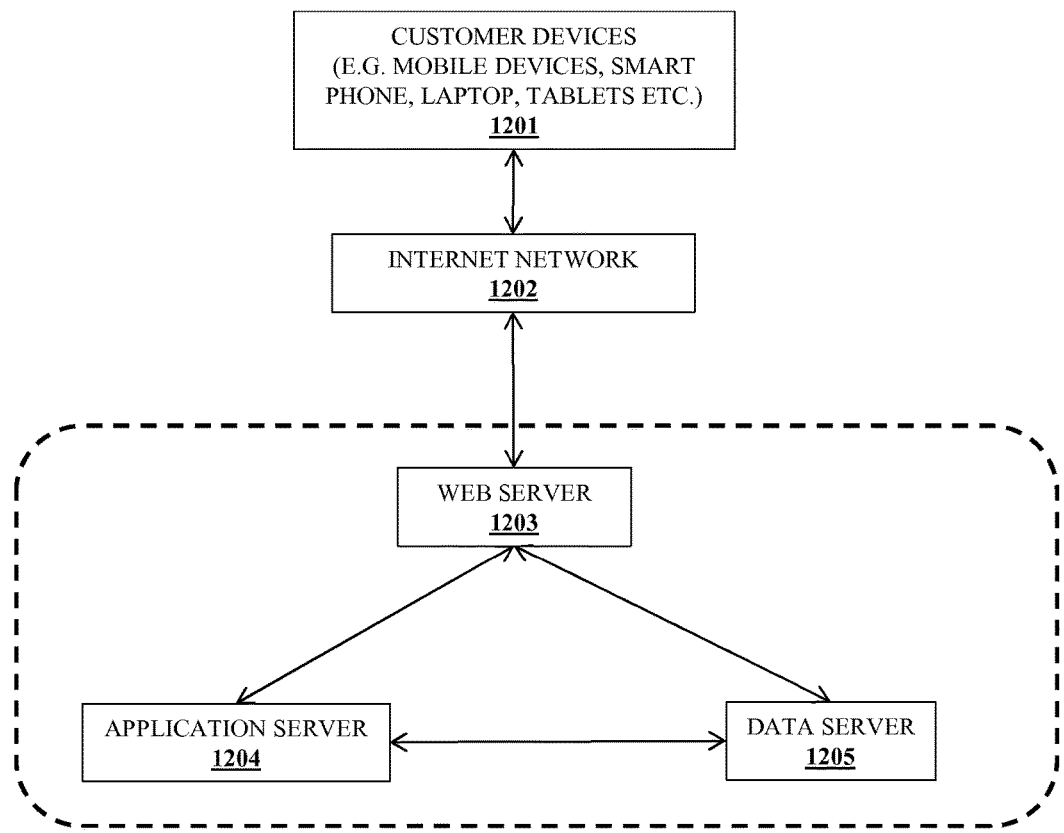
FIG. 12 is an exemplary illustration of the system architecture used in the gift card e-banking.

FIG. 11 is a block diagram of an exemplary system of selling the gift cards collected by the bank as a processing/conversion fee to the customer. Customer 1101 accesses gift card e-bank website via. any of the devices for example computer, laptop, tablet, smart phone, apps etc. 1102 and may or may not login 1103 in to his or her gift card bank account. A customer who does not has an account in the gift card e-bank can also buy a gift card from the GCEB website. If the customer wants to buy a gift card of his or her choice 1104, he or she can check the bank account/inventory 1105. If desired store balance 1105 is available, 1106 customer checks if desired denomination gift card is also available 1107. If it is available 1109 customer can take/buy this card 1111 and deposit it in his or her fixed account 1113 or print, email 1114 etc. If customer finds there is a balance of desired store in the bank 1105 but desired denomination gift card is not available 1108, customer can submit the request to the bank for the desired denomination gift card 1112 and the bank buys the card from the store and deposit/inform the customer 1112. If customer finds there is not enough balance 1116 of the desired store in the bank, customer is added in the waiting list 1117 and when desired balance is available in the bank, gift card can be deposited in the customer's fixed account 1113 or the customer may be informed about its availability 1113 and customer can buy 1111 and use at his or her convenience 1115. Other way of buying gift card is, customer can go to the gift card e-bank website 1103 and buy from the advertised card 1110, pay 1111 and use the card at his or her convenience 1115.

What is claimed is:

1. A method of gift card e-banking comprising:
 a) receiving a request from a customer for opening a gift card money account and a fixed account;
 b) opening and issuing account numbers to said customer for the gift card money account and the fixed account;
 c) receiving a request from the customer to deposit any amount of at least one gift card of a store in the gift card money account;
 d) based on the request, deposit the amount of the at least one gift card of a store in the gift card money account;
 e) charging a processing fee from the customer for depositing the amount of at least one gift card of a store in the gift card money account;

f) depositing the gift card received from the customer for depositing in the customer's gift card money account in an e-bank account;

g) receiving a request from the customer to perform one, two or all of:

> withdraw at least one gift card of a desired store and of desired denomination less than or equal to the gift card money available in the customer's gift card money account from the e-bank account and to deposit in the fixed account;
>
> with any gift card money remaining withdraw at least one gift card of a desired store and of desired denomination less than or equal to the gift card money available in the customer's gift card money account from the e-bank account and to deposit in another customer's fixed account;
>
> with any gift card money remaining transfer any amount in the customer's gift card money account to another customer's gift card money account;

h) based on the request, perform either one, two or all of:

> withdraw the at least one gift card and transfer the at least one gift card from the e-bank account to the fixed account;
>
> with any gift card money remaining withdraw the at least one gift card and transfer the at least one gift card from the e-bank account to another customer's fixed account;
>
> with any gift card money remaining transfer any amount in the customer's gift card money account to another customer's gift card money account.

2. The method of claim 1, wherein gift card e-banking is gift card online banking.

3. The method of claim 1, wherein a store is a participating store or a gift card issuer.

4. The method of claim 1, wherein the amount deposited in the gift card money account is not affiliated with a particular store.

5. The method of claim 1, wherein the gift card deposited in said e-bank account is available to all customers to withdraw from.

6. The method of claim 1, wherein depositing the received gift card in the e-bank account comprises one of:

> depositing the received gift card in the e-bank account if gift card is received directly from a store on behalf of a customer;
>
> converting the received gift card to a new gift card and depositing new gift card in the e-bank account if gift card is received directly from customer.

7. The method of claim 1, wherein at any time, a total amount of gift card withdrawal from the e-bank account is not more than the available balance in the customer gift card money account at that time.

8. A system comprising:

a processor; and a non-transitory memory storing instructions which, when executed by the processor, causes the processor to perform a method comprising:

a) receiving a request from a customer for opening a gift card money account and a fixed account;

b) opening and issuing account numbers to said customer for the gift card money account and the fixed account;

c) receiving a request from the customer to deposit any amount of the at least one gift card of a store in the gift card money account;

d) based on the request, deposit the amount of the at least one gift card of a store in the gift card money account;

e) charging a processing fee from the customer for depositing the amount of at least one gift card of a store in the gift card money account;

f) depositing the gift card received from the customer for depositing in the customer's gift card money account in an e-bank account;

g) receiving a request from the customer to perform one, two or all of:

> withdraw at least one gift card of a desired store and of desired denomination less than or equal to the gift card money available in the customer's gift card money account from the e-bank account and to deposit in the fixed account;
>
> with any gift card money remaining withdraw at least one gift card of a desired store and of desired denomination less than or equal to the gift card money available in the customer's gift card money account from the e-bank account and to deposit in another customer's fixed account;
>
> with any gift card money remaining transfer any amount in the customer's gift card money account to another customer's gift card money account; and h) based on the request, perform either one, two or all of:

> withdraw the at least one gift card and transfer the at least one gift card from the e-bank account to the fixed account;
>
> with any gift card money remaining withdraw the at least one gift card and transfer the at least one gift card from the e-bank account to another customer's fixed account;
>
> with any gift card money remaining transfer any amount in the customer's gift card money account to another customer's gift card money account.

9. The system of claim 8, wherein the amount deposited in the gift card money account is not affiliated with a particular store.

10. The system of claim 8, wherein the gift card deposited in said bank account is available to all customers to withdraw from.

11. The system of claim 8, wherein depositing the received gift card in the e-bank account comprises one of:

> depositing the received gift card in the e-bank account if gift card is received directly from a store on behalf of a customer;
>
> converting the received gift card to a new gift card and depositing new gift card in the e-bank account if gift card is received directly from customer.

12. The system of claim 8, wherein at any time, a total amount of gift card withdrawal from the e-bank account is not more than the available balance in the customer gift card money account at that time.

13. A non-transitory computer-readable medium storing executable instructions that are executed by a processor to perform operations comprising:

a) receiving a request from a customer for opening a gift card money account and a fixed account;

b) opening and issuing account numbers to said customer for the gift card money account and the fixed account;

c) receiving a request from the customer to deposit any amount of at least one gift card of a store in the gift card money account;

d) based on the request, deposit the amount of the at least one gift card of a store in the gift card money account;

e) charging a processing fee from the customer for depositing the amount of at least one gift card of a store in the gift card money account;

f) depositing the gift card received from the customer for depositing in the customer's gift card money account in an e-bank account;
g) receiving a request from the customer to perform one, two or all of:
  withdraw at least one gift card of a desired store and of desired denomination less than or equal to the gift card money available in the customer's gift card money account from the e-bank account and to deposit in the fixed account;
  with any gift card money remaining withdraw at least one gift card of a desired store and of desired denomination less than or equal to the gift card money available in the customer's gift card money account from the e-bank account and to deposit in another customer's fixed account;
  with any gift card money remaining transfer any amount in the customer's gift card money account to another customer's gift card money account; and
h) based on the request, perform either one, two or all of:
  withdraw the at least one gift card and transfer the at least one gift card from the e-bank account to the fixed account;
  with any gift card money remaining withdraw the at least one gift card and transfer the at least one gift card from the e-bank account to another customer's fixed account;
  with any gift card money remaining transfer any amount in the customer's gift card money account to another customer's gift card money account.

14. The non-transitory computer-readable medium of claim 13, wherein the amount deposited in the gift card money account is not affiliated with a particular store.

15. The non-transitory computer-readable medium of claim 13, wherein the gift card deposited in said e-bank account is available to all customers to withdraw from.

16. The non-transitory computer-readable medium of claim 13, wherein depositing the received gift card in the e-bank account comprises one of:
  depositing the received gift card in the e-bank account if gift card is received directly from a store on behalf of a customer;
  converting the received gift card to a new gift card and depositing new gift card in the e-bank account if gift card is received directly from customer.

17. The non-transitory computer-readable medium of claim 13, wherein at any time, a total amount of gift card withdrawal from the e-bank account is not more than the available balance in the customer gift card money account at that time.

* * * * *